H. B. BRADFORD & W. F. SELLERS.
JUICE HEATER.
APPLICATION FILED OCT. 14, 1915.

1,203,305.  
Patented Oct. 31, 1916.  
2 SHEETS—SHEET 1.

Witness  
Daniel Webster, Jr.

Inventors  
Henry B. Bradford and  
William F. Sellers  
By Francis T. Chambers  
his Attorney H. B. BRADFORD & W. F. SELLERS.
JUICE HEATER.
APPLICATION FILED OCT. 14, 1915.
1,203,305.
Patented Oct. 31, 1916.
2 SHEETS—SHEET 2.
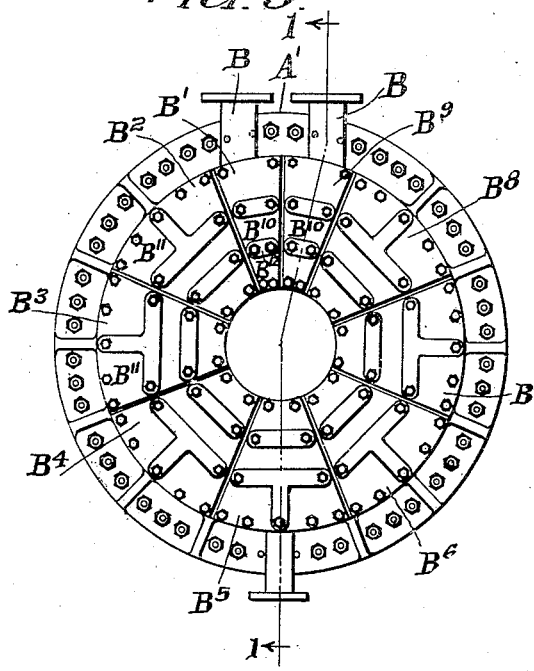
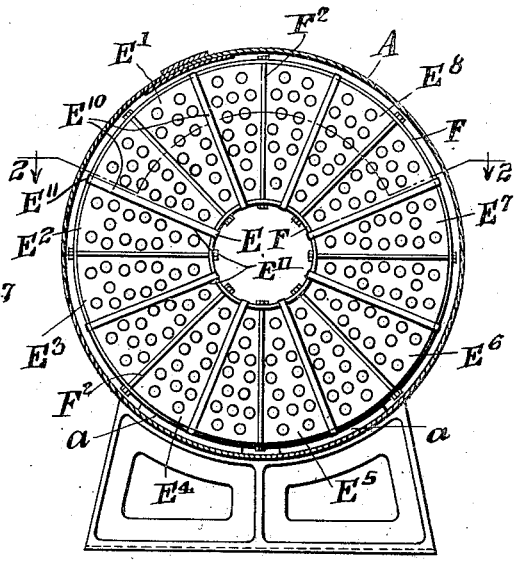
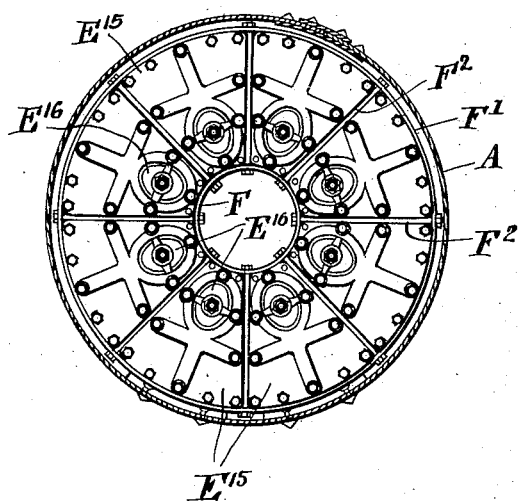

UNITED STATES PATENT OFFICE.

HENRY B. BRADFORD AND WILLIAM F. SELLERS, OF EDGEMOOR, DELAWARE, ASSIGNORS TO EDGE MOOR IRON COMPANY, OF EDGEMOOR, DELAWARE, A CORPORATION OF DELAWARE.

JUICE-HEATER.

1,203,305.  Specification of Letters Patent.  Patented Oct. 31, 1916.

Application filed October 14, 1915.  Serial No. 55,791.

*To all whom it may concern:*

Be it known that we, HENRY B. BRADFORD and WILLIAM F. SELLERS, citizens of the United States, residing in Edgemoor, Brandywine Hundred, county of New Castle, and State of Delaware, have invented a certain new and useful Improvement in Juice-Heaters, of which the following is a true and exact description, reference being had to the accompanying drawings, which form a part thereof.

Our present invention relates to heat interchanging apparatus, and particularly to a heat interchanging device especially adapted for use as a juice heater in sugar making and for like purposes in which the juice to be heated, or other fluid acted upon, is caused to flow through parallel groups of tubes back and forth across a chamber containing steam for heating the juice, or other fluid for acting thermally on the fluid passing through the tubes.

The general object of our invention is to provide a simple and effective device of the kind specified, and our invention is characterized by the provisions made for accommodating the relative expansion and contraction of parts due to temperature changes, and by provisions made for cleaning the apparatus from time to time when this is necessary.

The various features of novelty which characterize our invention are pointed out with particularity in the claims annexed to and forming a part of this specification. For a better understanding of the invention, however, and the advantages possessed by it, reference should be had to the accompanying drawings and descriptive matter in which we have illustrated and described a preferred embodiment of our invention.

Figure 1:
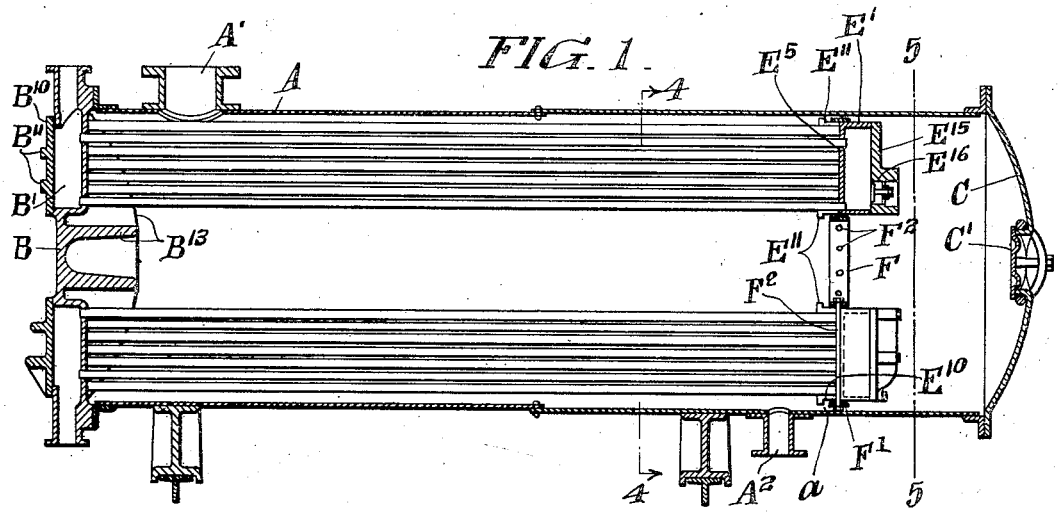
Figure 2:
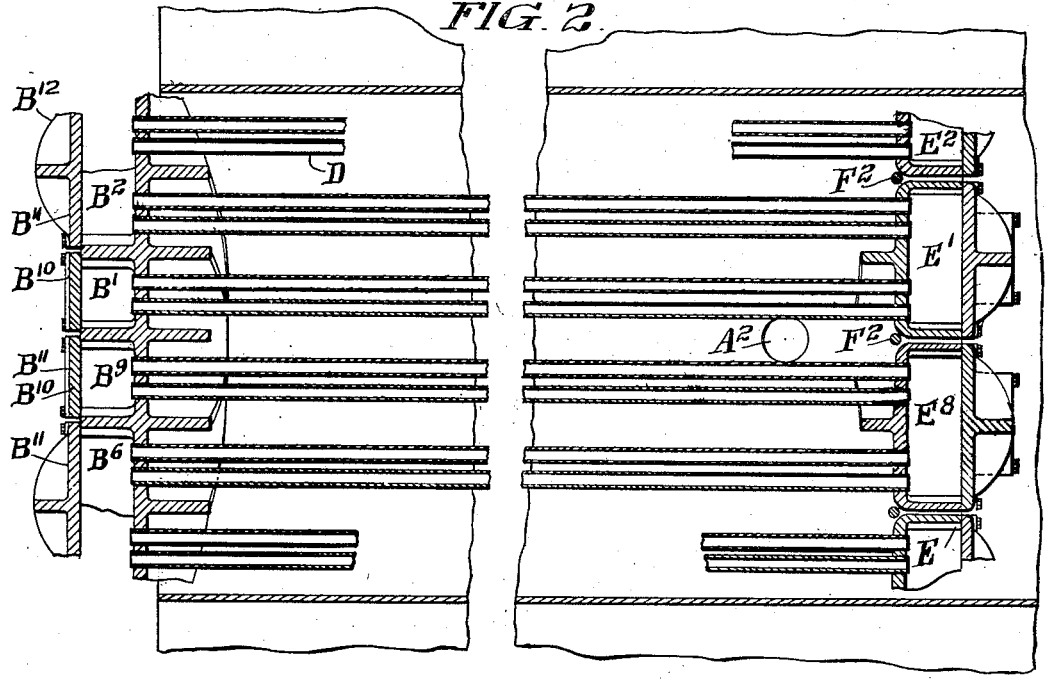

Of the drawings: Figure 1 is a longitudinal sectional elevation taken on the line 1—1 of Fig. 3; Fig. 2 is a developed section of a portion of the apparatus, the section being taken on the curved line 2—2 of Fig. 4; Fig. 3 is a left hand end elevation of the apparatus; Fig. 4 is a section taken on the line 4—4 of Fig. 1; and Fig. 5 is a section taken on the line 5—5 of Fig. 1.

The device shown in the drawings is primarily devised for use as a juice heater in sugar making. The device comprises a cylindrical casing A closed at one end by the chambered header B and at the other end by the cover or cylinder head C. Steam for heating the juice is admitted to the interior of the casing A through the steam inlet A' and water of condensation escapes through the outlet $A^2$.

The chambered header B is radially divided into sector shaped chambers B' to $B^9$ inclusive. The chamber B' which forms the inlet chamber for the juice to be heated, and the chamber $B^9$ which forms the outlet chamber, are each shown as half the size of the other chambers $B^2$ to $B^8$ inclusive.

$B^{10}$ represent removable covers closing the otherwise open front ends of the chambers B' and $B^9$, and $B^{11}$ represents the removable front covers for the chambers $B^2$ to $B^8$ inclusive. The covers $B^{10}$ and $B^{11}$ are formed with stiffening ribs $B^{12}$, and the chambered header B is formed on its inner side with stiffening ribs $B^{13}$.

The chambers B' to $B^9$ are connected by tubes D to sector shaped headers E' to $E^8$ inclusive. The juice to be heated enters the chamber B' and passes from that chamber through the corresponding tubes D into the sectional header E' from which it passes through the second group of tubes D connected to that chamber back to the front header chamber $B^2$, and so on successively through the headers and chambers $B^2$, $E^2$, $B^3$, $E^3$, $B^4$, $E^4$, $B^5$, $E^5$, $B^6$, $E^6$, $B^7$, $E^7$, $B^8$ and $E^8$, until it reaches the outlet chamber $B^9$. The manner in which the chambers are connected to permit this flow is indicated in Fig. 2. The tubes D may be expanded at their ends or otherwise rigidly secured to the front header B and to the sectional rear headers E'—$E^8$.

To accommodate the relative expansion and contraction of the groups of tubes connected to the different sectional headers E' to $E^8$, the latter are so supported that they may move relatively to one another in a direction parallel to the length of the tubes. Supporting and spacing means for the relatively movable sectional headers E' to $E^8$ comprise an inner ring or tire F, an outer ring or tire F' and radial connecting bolts $F^2$. Each of the sectional headers E', $E^2$ etc., is formed on its inner side with a central radial rib $E^{10}$ and the inner and outer tire members F and F' are engaged partly by the body and partly by the ends of the central rib $E^{10}$ of each sectional header. The tire members F and F' are held against displacement with respect to the sectional headers partly by the bolts F² which, as shown best in Fig. 2, are adapted to engage the sectional headers to limit relative displacement in one direction, and partly by the lugs E¹¹ formed at the ends of the radial ribs E¹⁰ which engage the tire members to limit displacement in the opposite direction. The movement of headers E', E², etc., relative to the tires permitted between the engagement of the lugs E¹¹ with the edges of the tires on the one hand, and the engagement of the bolts F² with the sectional headers on the other hand is ample to accommodate the expansion and contraction occurring in normal operation. The outer tire member F seats on pads $a$ provided at the bottom of the casing A.

Each of the sectional headers E' to E⁸ is formed with a removable head E¹⁵ and each head is formed with a hand hole and cover E¹⁶ therefor. The cover C at the right hand end of the casing A is formed with a manhole C', and in practice we so proportion the parts that a workman may enter the casing A through the manhole C' and clean out the chambers E' to E⁸ after removing the hand hole covers E¹⁶. This makes the cleaning out of the chambers E' to E⁸ a comparatively simple and easy operation since it is a simple matter to remove and replace and make tight the manhole cover C' and the hand hole covers E¹⁶, whereas the removal and replacement of the head C is a much more difficult operation on account of the size of the head and the difficulty in making the large joint surface at its periphery steam tight under the maximum steam pressure maintained within the casing A'. The removal of the heads B¹⁰ and B¹¹ to clean the different chambers B' to B⁹ is, of course, a comparatively simple and easy matter.

In the use of the device as a juice heater there is a tendency for the bulk of the dirt deposited in the headers to accumulate in the header chambers B', B², etc., and in the chambered sectional headers E' to E⁸ through which the juice to be heated first flows in its passage through the heater. With the construction described it is not necessary to disturb the chambers not needing cleaning to clean those which do need cleaning. Inasmuch as the difference in the temperature of different tubes connected to each of the chambered sectional headers E'—E⁸ is but a small fraction of the total difference between the temperatures of the juice in chambers B' and B⁹, the relative expansion and contraction of the different tubes connected to each of the headers E'—E⁸ may readily be taken care of by the elasticity of the connected metallic parts. The relative expansion and contraction of the tubes connected to the different sectional headers E' to E⁸ is provided for very effectively with the arrangement disclosed. Advantageously a normally closed wash water outlet B²⁰ is provided at the bottom of the chamber B⁵.

While in accordance with the provisions of the statutes we have illustrated and described the best form of our invention now known to us, it will be apparent to those skilled in the art that changes can be made in the form of our invention without departing from its spirit, and that some features of our invention can be used without a corresponding use of other features of the invention.

Having now described our invention, what we claim as new and desire to secure by Letters Patent, is:—

1. In a device of the kind described, the combination with a casing having an end wall at one end with a man hole opening therein and a cover for said opening, a chambered header closing the opposite end of said casing, tubes located within the casing and communicating with the chambers in said header, sectional headers to which the opposite ends of the tubes are connected, said headers being formed with hand hole openings and covers for said openings.

2. In a device of the kind described, the combination with a casing, a chambered header at one end thereof, tubes located within the casing and communicating with the chambers in said header, a circular series of sectional headers to which the opposite ends of the tubes are connected, and spacing provisions for said sectional headers comprising an internal ring, an external ring, and bolts connecting said rings passing between the tubes connected to the different headers.

3. In a device of the kind described, the combination with a cylindrical casing of a chambered header at one end thereof formed with a circular series of chambers, tubes located within the casing and communicating with the chambers in said header, a circular series of sectional headers to which the opposite ends of the tubes are connected and provisions for maintaining said sectional headers in a predetermined spaced relation while permitting the headers to move in the direction of length of the tubes as the latter expand and contract.

4. In a device of the kind described, the combination with a casing of a chambered header at one end thereof formed with a circular series of chambers, a series of tube units through which said chambers are connected for a flow in series therethrough, each of said units comprising one group of tubes connected to one of said chambers and another group of tubes connected to another of said chambers and a sectional header to which the opposite ends of both groups of tubes are connected, and spacing provisions for the sectional header ends of said units comprising a spider like structure having radial arms between which the units are received.

5. In a device of the kind described, the combination with a casing of a chambered header at one end thereof formed with a circular series of chambers, tubes located within the casing and communicating with the chambers in said header, a circular series of sectional headers to which the opposite ends of the tubes are connected, each header being formed at its inner end with a radial rib, and spacing provisions for said sectional headers comprising an internal ring and an external ring engaged by the headers and the ends of the radial ribs thereof, bolts connecting said rings passing between the tubes connected to the different headers, said ribs being formed with portions adapted to engage the edges of said rings to thereby limit the relative movement of the headers and rings.

HENRY B. BRADFORD.
W. F. SELLERS.